(12) United States Patent
Cornu et al.

(10) Patent No.: US 7,670,413 B2
(45) Date of Patent: Mar. 2, 2010

(54) ANTI-MICROBIAL PURIFICATION DEVICE, WHICH DIFFUSES A VOLATILE PURIFICATION AGENT, FOR VENTILATION, HEATING AND/OR AIR-CONDITIONING SYSTEMS, IN PARTICULAR IN VEHICLES

(75) Inventors: Laurence Cornu, Saint Arnoult en Yvelines (FR); Gilles Elliot, Courcouronnes (FR); Frederic Ladrech, Maurepas (FR)

(73) Assignee: Valeo Systemes Thermiques, S.A.S., Le Mesnil Saint Denis (FR)

( * ) Notice: Subject to any disclaimer, the term of this patent is extended or adjusted under 35 U.S.C. 154(b) by 811 days.

(21) Appl. No.: 11/455,475

(22) Filed: Jun. 19, 2006

(65) Prior Publication Data

US 2007/0006736 A1    Jan. 11, 2007

(30) Foreign Application Priority Data

Jun. 22, 2005    (FR) .................................. 05 06352

(51) Int. Cl.
*B01D 39/00* (2006.01)

(52) U.S. Cl. ............................. 96/222; 96/223; 96/226; 96/227; 422/112; 422/124

(58) Field of Classification Search ........... 96/222–223, 96/226–227; 422/112–124
See application file for complete search history.

(56) References Cited

U.S. PATENT DOCUMENTS

| | | | | |
|---|---|---|---|---|
| 3,017,239 A * | 1/1962 | Rodman | ...................... | 96/226 |
| 4,959,087 A | 9/1990 | Kappernaros et al. | | |
| 5,240,484 A * | 8/1993 | Genovese et al. | .............. | 96/226 |
| 5,258,051 A | 11/1993 | Anderson et al. | | |
| 5,874,052 A * | 2/1999 | Holland | ...................... | 422/171 |
| 5,876,489 A * | 3/1999 | Kunisaki et al. | .............. | 96/226 |
| 6,487,868 B2 * | 12/2002 | Sato et al. | .................. | 62/176.1 |
| 6,524,375 B2 * | 2/2003 | Brun | ............................ | 96/222 |
| 7,118,608 B2 * | 10/2006 | Lovell | ........................ | 55/385.1 |
| 2001/0039882 A1 * | 11/2001 | Brun | ............................ | 96/222 |
| 2002/0164942 A1 * | 11/2002 | Elliot | .......................... | 454/121 |
| 2003/0021721 A1 * | 1/2003 | Hall | .............................. | 422/4 |
| 2003/0039576 A1 * | 2/2003 | Hall | .............................. | 422/4 |
| 2003/0186643 A1 | 10/2003 | Feuillard et al. | | |
| 2004/0094037 A1 * | 5/2004 | Maleeny et al. | ............... | 95/285 |
| 2005/0042147 A1 * | 2/2005 | Rees et al. | ................... | 422/124 |
| 2005/0150385 A1 * | 7/2005 | Huang et al. | .................. | 96/69 |
| 2005/0191217 A1 * | 9/2005 | Selander | ..................... | 422/124 |
| 2006/0026936 A1 * | 2/2006 | Paumier et al. | ............... | 55/473 |

(Continued)

FOREIGN PATENT DOCUMENTS

WO    WO 2005/009493    2/2005

*Primary Examiner*—Jason M Greene
*Assistant Examiner*—Dung Bui
(74) *Attorney, Agent, or Firm*—Howard & Howard Attorneys PLLC (57) ABSTRACT

An antimicrobial purification device for ventilation, heating and/or air conditioning systems diffuses a volatile purification agent. The antimicrobial purification device includes an air filter (1) having a frame (2) holding a filtering agent (3). The filter (1) comprises at least one means for integrating substrate (5) holding the purification agent, consisting of a housing (4) holding the substrate (5) positioned in the frame (2) of the filter (1) or in a container mounted on this frame (2). A cap (6) sealing the housing (4) is fitted with a pin (18) to pierce a protective cover (19) in order to diffuse the purification agent as required.

24 Claims, 6 Drawing Sheets

U.S. PATENT DOCUMENTS

| | | |
|---|---|---|
| 2006/0110297 A1* | 5/2006 | D'Amico et al. ............ 422/124 |
| 2007/0144961 A1* | 6/2007 | Tani et al. ................ 210/502.1 |
| 2008/0003132 A1* | 1/2008 | McGee et al. ................ 422/4 |
| 2008/0193328 A1* | 8/2008 | Crapser et al. ................ 422/5 |
| 2008/0210094 A1* | 9/2008 | Hara et al. .................... 96/222 |
| 2008/0264259 A1* | 10/2008 | Leung ......................... 96/143 |
| 2008/0314248 A1* | 12/2008 | Peteln ............................. 96/1 |

* cited by examiner fig.1 fig.2 fig.3 fig.4 fig.5 fig.6 fig.13 fig.14

ANTI-MICROBIAL PURIFICATION DEVICE, WHICH DIFFUSES A VOLATILE PURIFICATION AGENT, FOR VENTILATION, HEATING AND/OR AIR-CONDITIONING SYSTEMS, IN PARTICULAR IN VEHICLES

THE TECHNICAL FIELD OF THE INVENTION

The invention relates to ventilation, heating and/or air conditioning systems, in particular for vehicle passenger compartments. It relates to an air purification device, which prevents the growth of micro-organisms inside such systems, by diffusing a volatile purification agent.

THE STATE OF THE ART

A general problem posed in the field of ventilation, heating and/or air conditioning systems, in particular for vehicle passenger compartments, lies in the purification of such systems in order to prevent the growth of micro-organisms liable to generate unpleasant odors and/or be a source of discomfort for the vehicle's passengers. Such odors are particularly caused by the phenomena of gaseous pollutant adsorption and desorption, and by the aforementioned growth of micro-organisms.

In order to prevent the growth of micro-organisms, a recognized means consists of applying a specific purification treatment to the filter contained in the system, prior to installing the latter. As regards odors, a recognized means is to use deodorants or antiseptic sprays. It has emerged from use that these system purification treatments are unsatisfactory in terms of durability, resulting in the need for frequent repetitions of the latter. Furthermore, their effectiveness is doubtful and uncertain in sections colonized by micro-organisms. Moreover, as the purification treatments generally applied are not preventive, their frequent application is rendered all the more essential.

One solution consists of installing an antimicrobial purification device inside the system. However, this poses the problem of how to perform such an installation.

More specifically, such an installation must not be implemented to the detriment of the size of the system, which must be as small as possible, or result in significant additional costs. In addition, it is desirable that this installation should not be implemented at the expense of a standardized version of the system, while allowing for modularity in terms of the choice of whether or not to use the antimicrobial purification device, when integrating the system as part of the vehicle design phase, and/or at vehicle OEM level, and/or during subsequent maintenance operations.

THE OBJECT OF THE INVENTION

The purpose of this invention is to produce an antimicrobial purification device, which diffuses a volatile purification agent for ventilation, heating and/or air conditioning systems, in particular in vehicles. The purpose of this invention is more specifically to produce such a device, which results in a limited increase in the size of the system, and which permits standardization of the aforementioned system, while offering the option to install the device or not, as the manufacturer wishes, and/or at vehicle OEM level, and/or during subsequent maintenance operations on the vehicle and/or the system.

This invention relates to an antimicrobial purification device, which diffuses a volatile purification agent, for ventilation, heating and/or air conditioning system, in particular in vehicles. Such a system comprises a passenger compartment air filter consisting of a frame holding a filtering agent. The air filter may be, for example, a particle filter, a combined filter, an activated carbon filter, a photo-catalytic filter, a plasma filter, an electrostatic filter or any other similar filter.

According to the present invention, such a device is essentially characterized by the fact that the filter comprises at least one means for integrating a substrate that holds the purification agent. The substrate is, for example, a wick or similar item impregnated with a purification agent, or a sachet containing a gel or similar substance. As a general rule, the substrate may consist of any device that holds the purification agent, the aforementioned agent being a volatile agent diffusing by means of the aforementioned device in order to apply a purification treatment. Moreover, the filter may be equipped with one or more means for integrating the aforementioned substrate.

According to an alternative embodiment of the aforementioned means of integration, the aforementioned means preferably consists of a housing to hold the substrate positioned on the frame of the filter.

The housing is specifically positioned on the frame of the filter, extending along at least any one of the sides of the aforementioned filter. More specifically, the housing may extend parallel and/or perpendicular and/or crosswise to the extension of the folds formed by the filtering agent.

The frame is specifically shaped in the form of a box. Such a box consists, for example, of side members and/or crosspieces holding the filtering agent. In an example of an embodiment, the frame is formed from at least one wall which is molded (by injecting the edges of the box in a liquid state around the filtering agent), bonded (by attaching the filtering agent to the edges of a previously molded box using an adhesive) or welded (by assembling the box and filtering agent using finished parts). These walls preferably extend along the outer edges of the agent. The housing is preferably positioned inside one of the edges of the box. According to another embodiment, the housing may be positioned between two opposite edges of the box, such as in a mid section of the aforementioned box.

The frame being equipped with a hatch that seals off the channel used to place the filter inside the system, the housing is, for example, positioned on the aforementioned hatch.

According to another alternative embodiment of the aforementioned means of integration, the latter consists of a container attached to the frame in such a way as to form a single component with the filter, by means of welding, bonding or riveting. This container comprises a housing that holds the substrate. The frame being shaped in the form of a box, the container is preferably mounted laterally along one edge of the box, which is equipped with a trough for holding the container, if required.

The container may also be mounted on the frame by means of molding. Specifically, when molding the filter, one particular stage consists of adding material, by molding, to the filter frame to form the container. According to another embodiment of the container, it is positioned on the filter during the same molding operation. More specifically, the container is positioned jointly with the filter frame by molding.

According to a particular embodiment of the container, the latter comprises at least two axial extension zones, one of which holds the housing and the other forms an extension of the container along the entire corresponding wall of the frame, to prevent the formation of a zone in which the air flow is not filtered.

The aforementioned housing, which may be positioned on the filter frame or on the container, is preferably sealed with a cap equipped with the means to connect with the filter and particularly with the frame of the latter or with the container. Such a cap may be standard for any type of filter. According to various embodiments, the means for connecting the cap to the filter are reversible irreversible means of connection. More specifically, the connection between the cap and the filter may be created in a reversible manner, such as by means of a screw fitting, using fixing components, such as screws or clips, or by means of a flexible fitting, or in an irreversible manner by means of welding, bonding or a push fitting.

Preferably and depending on the means used to connect the cap to the filter, the cap may be attached to the filter by means of a holding device, for example, a flexible hinge, a tie or similar holding device.

According to another embodiment, the cap is permanently attached to an intermediate cartridge, which houses the substrate.

If necessary, the cap is fitted with a pin for piercing a protective cover sealing the housing. The substrate is, for example, housed inside a container which is preferably equipped with the aforementioned protective cover. According to other alternative embodiments, this protective cover is positioned at the end of the substrate, or is positioned inside the housing created within the filter to hold the substrate. If the substrate is housed in the intermediate cartridge or a similar container, the aforementioned protective cover may be positioned in the opening of the aforementioned cartridge or container.

Preferably, where the cap comprises a pin, the means for connecting the cap to the frame is a connection comprising two positions for the cap to be mounted freely on the frame; one is a standby position in which the pin is held at a distance from the protective cover and the other is an activation position in which the pin pierces the protective cover to release the volatile purification agent.

Thanks to the layout of this present invention, the system is equipped with an air purification device using volatile agent, without the size of the system being considerably increased, and with a limited reduction in the filtration surface area. In particular, the housing and/or container may be positioned within the volume of a standard size filter, without significantly reducing the filtration surface area. Where applicable, if the addition of the housing and/or container to the frame of the filter leads to an increase in the standard filter volume, a holding clearance of the same volume as this increase may be created in the wall of the system, to prevent a reduction in the filtering surface area of the filter, however small this may be.

This invention also relates to a ventilation, heating and/or air conditioning system equipped with an air purification device conveyed using a volatile purification agent. Such a system particularly comprises at least one filter, incorporating the means to integrate a substrate holding the purification agent.

The filter may be placed upstream and/or downstream of an evaporator contained within the system.

According to an initial alternative embodiment of such a system, the filter is housed inside a unit that also contains functional components of the system, such as an evaporator and a propellant that generates a flow of air. According to another alternative embodiment of such a system, the filter is housed in a dedicated unit and is placed beneath a cowl on the vehicle in order to be accessible from the engine compartment. Such a cowl is specifically formed by a receptacle positioned in the upper section of the bulkhead that separates the passenger compartment from the engine compartment, at the base of the windscreen.

DESCRIPTION OF THE ILLUSTRATIONS

This invention will be understood more clearly on reading the description that is made of the preferred embodiments, with reference to the appended illustrations, in which.

Figure 1:
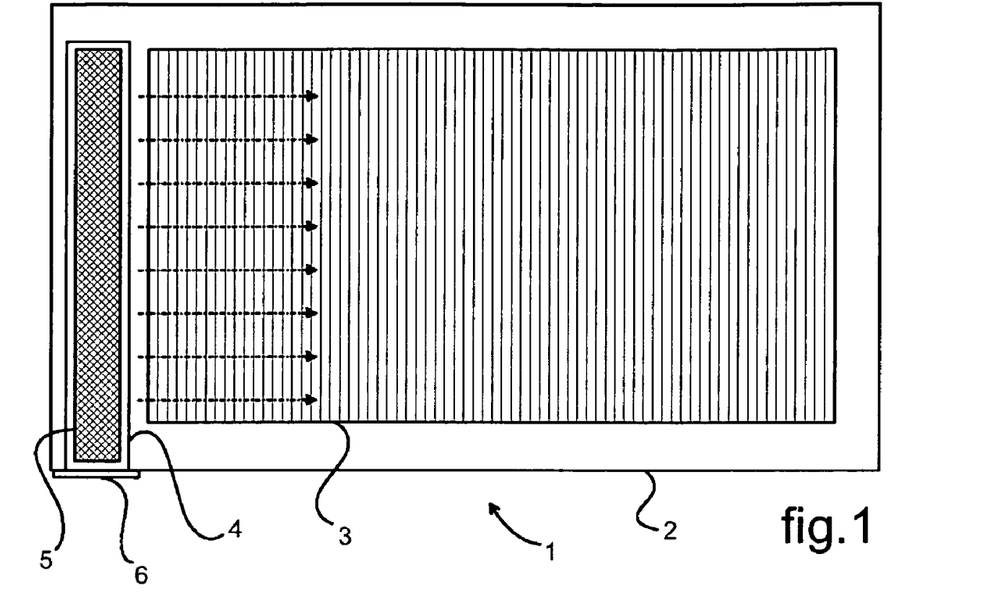
FIGS. 1 and 2 respectively are examples of a version of this invention, according to an embodiment in which a housing is positioned along the edge of the frame of a filter in order to hold a substrate impregnated with a purification agent.
Figure 2:
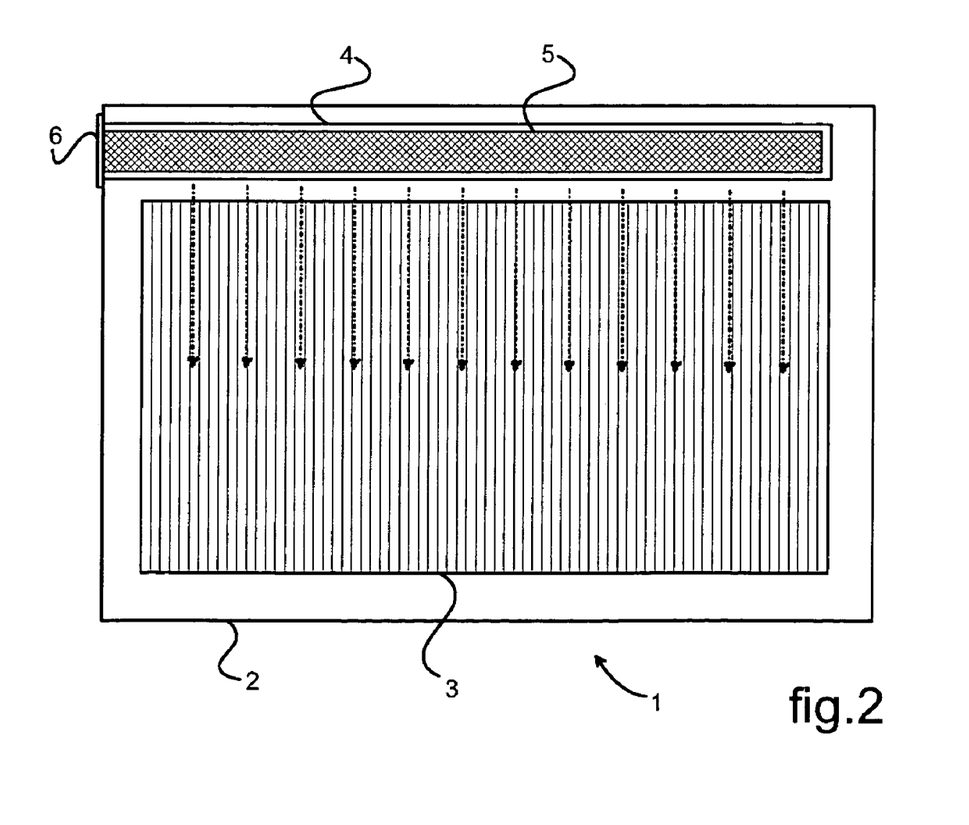

In FIGS. 1 and 2, a filter (1) of a ventilation, heating and/or air conditioning system, in particular in a vehicle, essentially consists of a frame (2) formed in the shape of a box holding a filtering agent (3). A housing (4) is positioned inside one of the edges of the frame (2), in order to hold a substrate (5), such as a wick or similar item, impregnated with a volatile purification agent.

The substrate is, for example, formed from a cohesive porous substance. This substance consists, for example, of a mass that may be formed by a textile material, such as natural or artificial mixed textile fibers, from a cellulose mass, such as a thick absorbent wad in the shape of a pad or strip, from a material formed from a mineral or plant substrate, partitioned and compressed if required, from a cohesive mass of polymer powder, or even from a material of animal origin such as porous leather.

More specifically if the cohesive porous substance is made of textile material, this material may be wool, cotton, a synthetic micro-fiber such as polypropylene, or any other natural or artificial textile material.

More specifically again, if the cohesive porous substance is a plant-based material, this material may be cellulose wadding, white wood such as fir or pine, chestnut, compressed sawdust, sphagnum peat or any other similar plant-based material.

More specifically again, if the cohesive porous substance is a mineral material, this material may be montmorillonite, attapulgite, an earthy mixture such as cellulose mixed with kaolin, calcinated diatom earth, magnesia, lime, metal oxides such as iron or aluminum, silicates, vermiculite, activate carbon, silica, siliceous earth or another similar mineral.

The substrate may also be formed from a permeable sachet containing the purification agent in a liquid or gel state.

The purification agent is an antimicrobial and/or fungicidal and/or odorous and/or disinfectant agent, such as allylisothiocynate or similar purification agent.

The opening of the housing (4) is sealed by a cap (6), which is mounted on the frame (2) in a reversible or irreversible manner as described below.

The integration of such a housing (4) into the filter (1), particularly on the frame (2) of the latter, makes it possible to give the filter (1) a standardized structure for any system, nevertheless offering the option of positioning the substrate (5) within the means for integrating the latter provided within the filter, for this purpose or not. The substrate (5) may be installed as required, for example according to the wishes of a vehicle manufacturer, and/or at vehicle OEM level and/or subsequently during maintenance operations on the system and/or vehicle. More specifically, the filter (1) may be used in the same configuration of the system, equipped with a substrate (5) or not. The latter may come in the form of a standard package for all filters (1), offering the advantage of a reduction in production costs due to the high production volumes of such standardized filters (1) and substrates (5). Furthermore, integration of the substrate (5) into the filter (1), inside the housing (4) positioned within the latter, enables it to be integrated without the use of additional components, such as a cartridge housing the substrate (5). The latter is preferably positioned on the frame (2) away from the flow of air, or at least in a section of the frame (2) that is normally full, such that integration of the substrate (5) does not result in any aeraulic loss.

The means for integrating the substrate (5) into the filter (1) are designed for diffusion of the purification agent at a pre-determined daily rate. For example, the housing (4) is dimensioned inside the filter (1) in order to obtain just such a level of diffusion. More specifically, the permeable wall of the filter (1) through which the purification agent is diffused is a polypropylene wall containing 20% talc, measuring approximately 0.9 mm thick, +/−10%, with an overall housing surface area of approximately 4200 $mm^2$, +/−10%. This type of layout makes it possible to obtain a daily diffusion of the purification agent of approximately 45 mg at 40° C. The housing may also be dimensioned to create a thickness of material through the wall of the frame and/or the container attached to the latter, resulting in a daily diffusion of between 5 mg and 50 mg at 30° C. This diffusion should preferably be approximately 18 mg per day, +/−10%.

Figure 3:
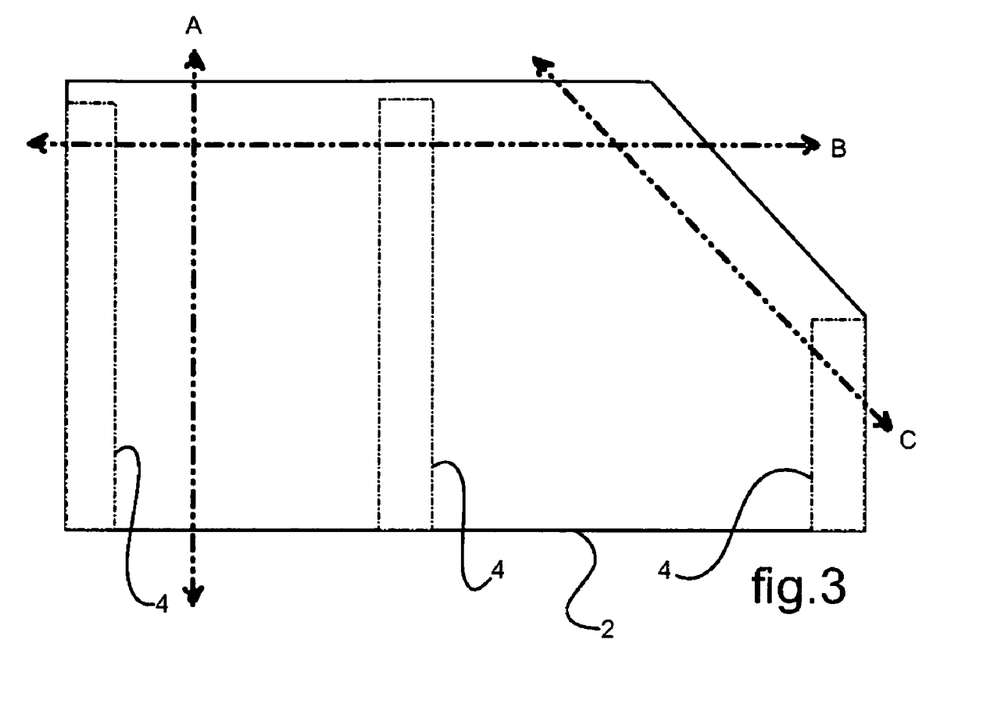
FIG. 3 is a diagram illustrating the various alternative orientations of a housing of the type shown in FIGS. 1 and 2.

In FIG. 1, the housing (4) is positioned inside a lateral edge of the frame (2), while in FIG. 2, the housing (4) is positioned inside a longitudinal edge of the frame (2). With reference to FIG. 3, the housing (4) may be positioned on the frame (2) in a direction corresponding to at least any one of the dimensions of the aforementioned frame (2). More specifically, the housing (4) may be positioned in direction A, parallel to a lateral edge of the frame (2), and/or in direction B, parallel to a longitudinal edge of the frame (2), and/or in direction C, at an angle to the main surface of the frame (2). Depending on the different respective positions of the housing (4) shown in FIG. 3 using dotted lines, the aforementioned housing may be positioned at the edge of the frame (2) to prevent losses of the air flow passing through the filtering agent (3), or positioned in the mid section of the filter (1) to encourage more uniform diffusion of the purification agent onto the system's evaporator. However, it is preferential to position the housing (4) along the edge of the frame (2), in an obstacle section normally present and occupied by the edge of the filter (1), to prevent any increases in aeraulic losses.

Figure 4:
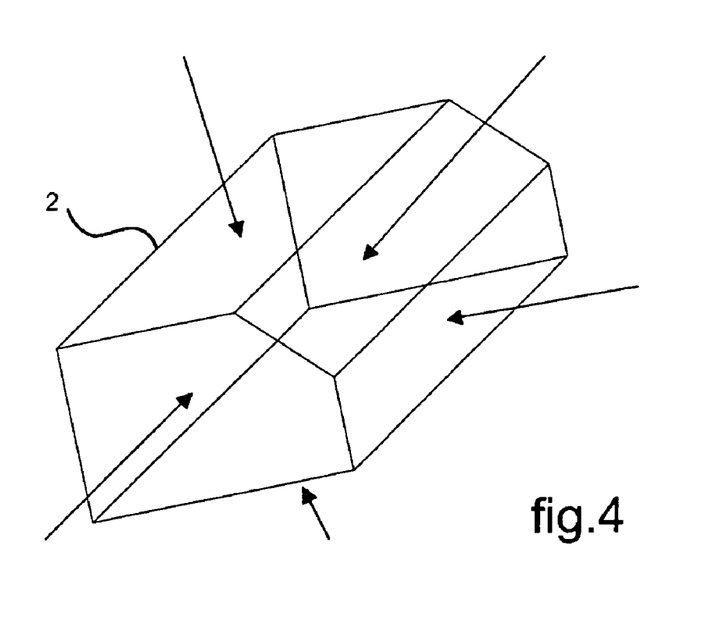
FIG. 4 is a diagram illustrating the various alternative means for placing a substrate inside a housing of the type shown in FIGS. 1 and 2.

In FIG. 4, the opening of the housing (4) may be positioned on any side of the filter (1), being oriented along any dimension of the frame in order to place the substrate (5) along one of these dimensions.

Figure 5:
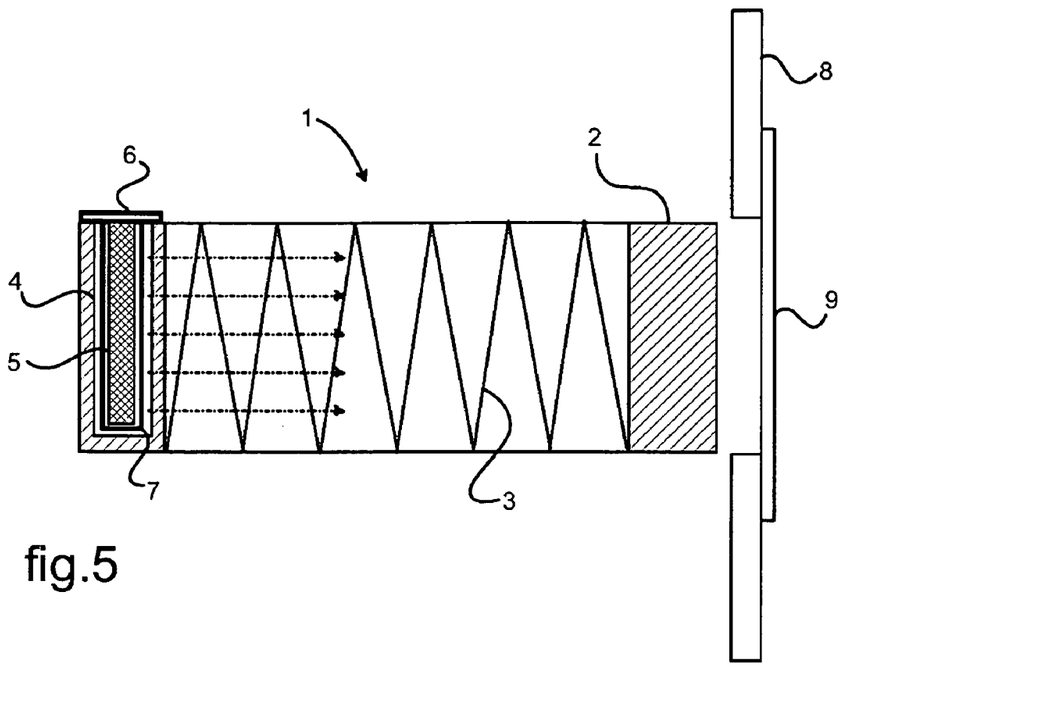
FIGS. 5 and 6 respectively are other examples of embodiments of a device according to the present invention.

In FIG. 5, the housing (4) is positioned within the frame (2) parallel to the folds of the filtering agent (3). The substrate (5) is placed inside an intermediate cartridge (7) fitted with a cap (6) sealing the opening of the housing (4). The filter (1) is placed inside the system via a channel in the wall (8) of the latter, which is closed using a hatch (9) that allows access to the filter (1), independent of the latter. This intermediate cartridge (7) is specifically permeable in order to allow diffusion of the volatile agent in accordance with the pre-determined daily rate.

Figure 6:
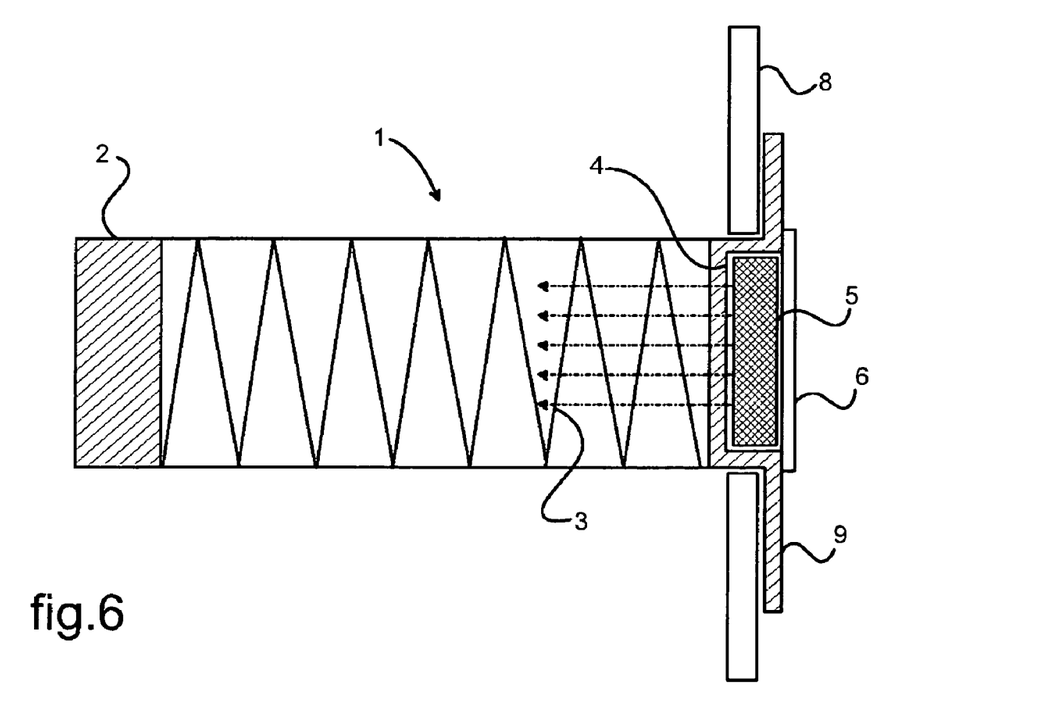

In FIG. 6, the frame (2) incorporates the hatch (9) sealing the channel in the wall (8) of the system used to insert and install the filter (1). The housing (4) holding the substrate (5) is positioned inside the hatch (9) and is sealed with an independent cap (6) mounted in a reversible or irreversible manner onto the hatch (9). The frame (2) and the hatch (9) preferably form a single component, the filter (1) being replaced by replacing the whole of the aforementioned single component.

Figure 7:
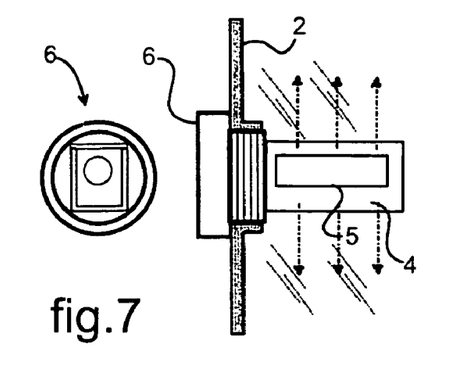
FIGS. 7 to 12 respectively are illustrations of different embodiments of a sealing cap for a housing of the type shown in FIGS. 1 and 2.
Figure 8:
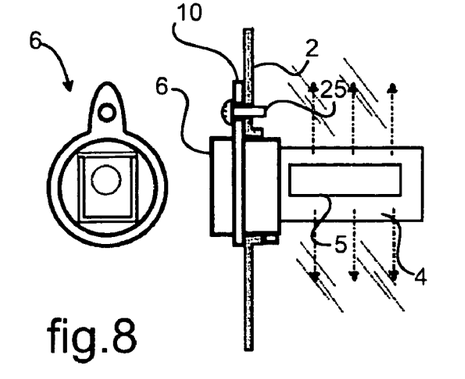
Figure 9:
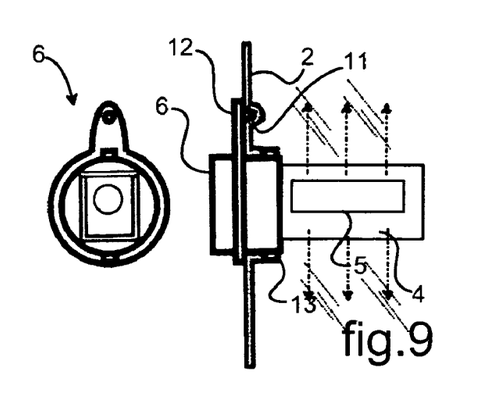
Figure 10:
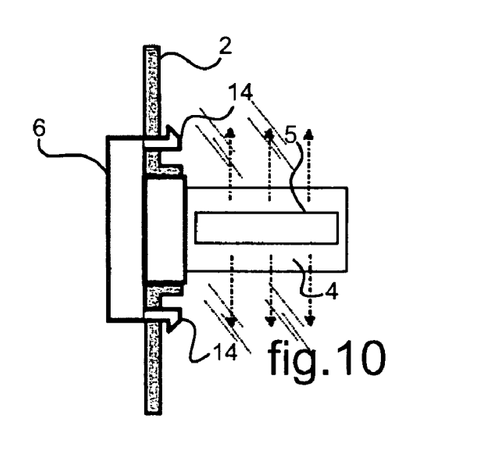
Figure 11:
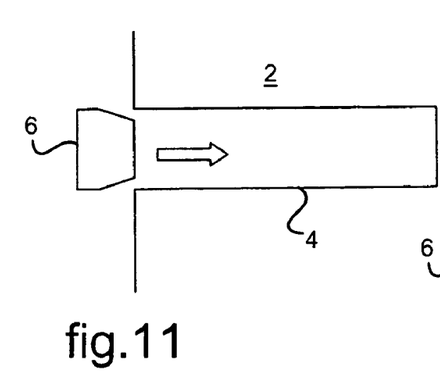
Figure 12:
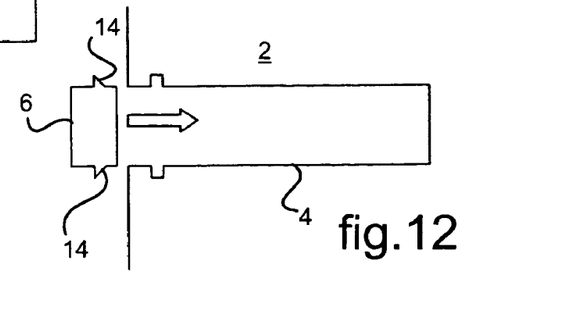

In FIGS. 7 to 12, the cap (6) is used to seal the opening of the housing (4), which preferably directly holds the substrate (5). The housing (4) is positioned in the frame (2), on which the cap (6) is mounted, either in a reversible manner as shown in FIGS. 7 to 9, or in a permanent manner as shown in FIGS. 10 to 12. In FIG. 7, the cap (6) is mounted on the frame (2) using a screw fixing. In FIG. 8, the cap (6) is mounted on the frame (2) using a screw (25) passing through a tab (10) positioned on the cap (6). In FIG. 9, the cap (6) is mounted on the frame (2) using a fitting pin (11) positioned on a tab (12) position on the cap (6). A quarter-turn lug connector (13) preferably completes attachment of the cap (6) to the frame (2). In FIGS. 10 to 12, the cap (6) is mounted on the frame (2) using a permanent fitting. In FIGS. 10 and 12, the cap (6) is mounted on the frame (2) using clips (14). In FIG. 11, the cap (6) is mounted on the frame (2) using a push fitting. According to another alternative embodiment not shown, the cap (6) is permanently mounted on the frame (2) by means of bonding. These examples of connections between the cap (6) and the frame (2) are provided for information and may be replaced by any other reversible or permanent means of connection.

Figure 13:
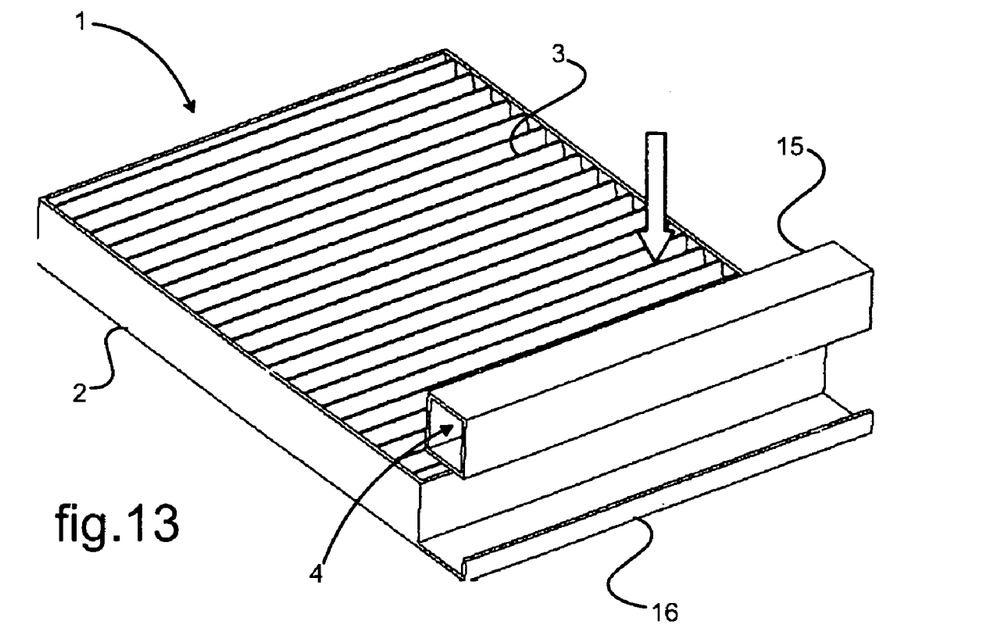
FIGS. 13 and 14 are diagrams successively illustrating another embodiment of a device according to the present invention.
Figure 14:
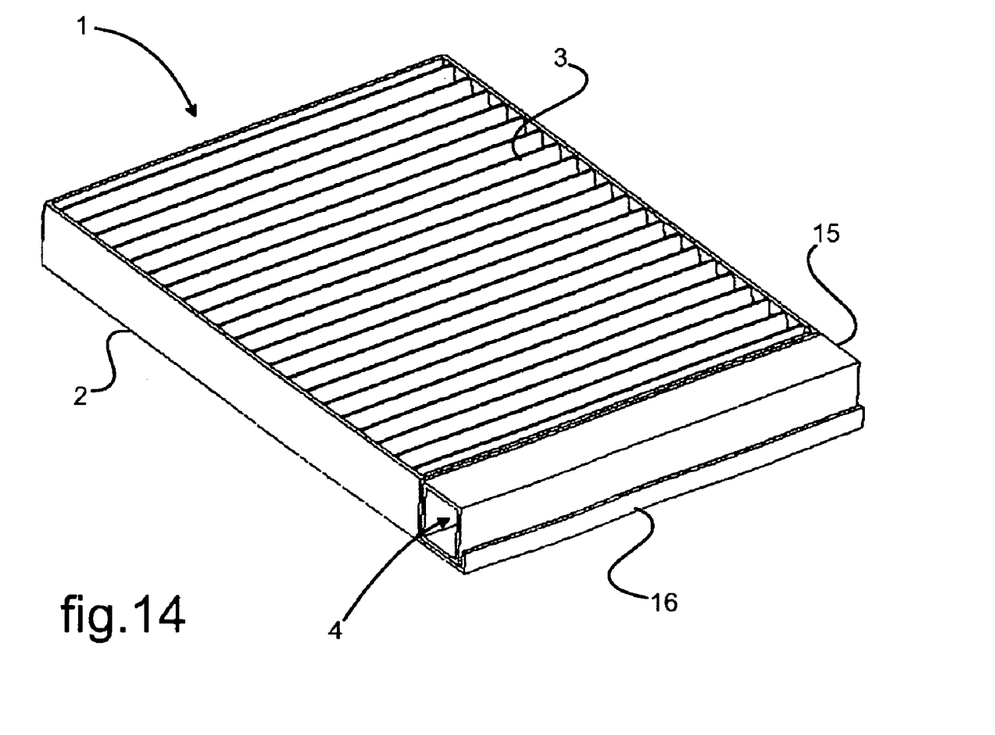

In FIGS. 13 and 14, the housing (4) holding the substrate (5) is represented by a container (15) mounted on the frame (2), along the edge of one of the sides of the latter, a lateral side in the embodiments shown. This mounting is specifically carried out in a permanent manner by welding, bonding, riveting or other similar means. In this alternative embodiment, the frame (2) comprises a trough (16) designed to hold the container (15). According to alternative embodiments not shown, the container (15) is mounted onto the frame by means of molding, or is even formed by molding with the frame to form a single component. According to another embodiment, the aforementioned trough (16) is represented by the last fold of the filtering agent, which is folded in such a way as to form the trough (16). The container (15) is preferably of a size equal to that of the side of the frame (2) on which it is positioned, in order to limit the non-filtration zone for air flowing through the system.

Figures 15, 16, 17:
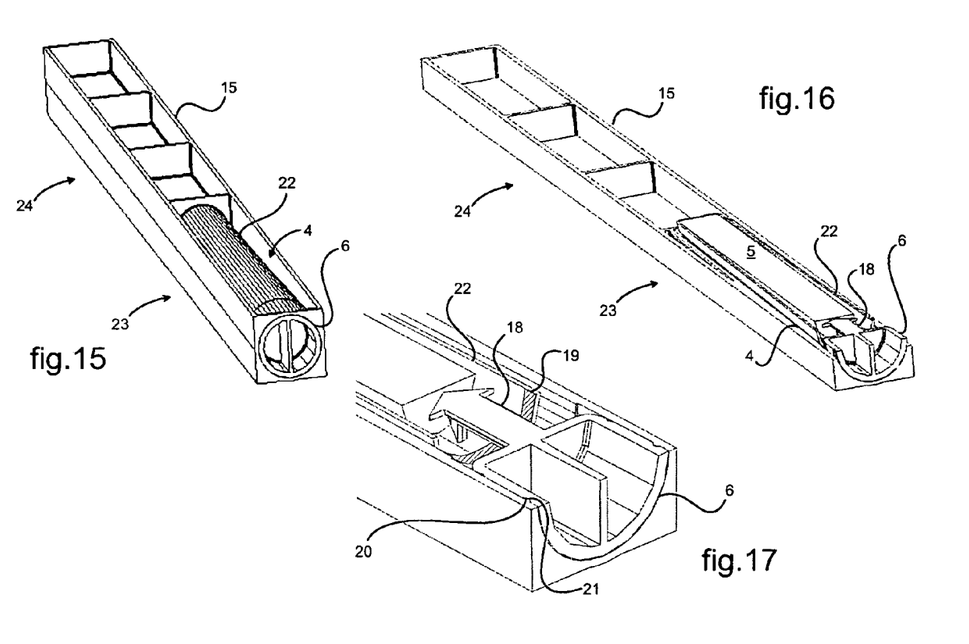
FIG. 15 is a diagram illustrating an example of the layout of a container forming part of a device according to the present invention.
FIG. 16 is a longitudinal section of a container shown in FIG. 15.
FIG. 17 is a detailed illustration of FIG. 16.

In FIGS. 15 to 17, the housing (4) holding the substrate (5) is positioned inside a container (15) designed to be attached to the filter (1). This container (15) comprises the housing (4) holding the substrate (5). The cap (6) sealing the opening of the housing (4) is fitted with a pin (18) designed to pierce a protective cover (19) sealing the opening of the housing (4). The cap (6) is mounted freely on the container (15), between a standby position, in which the pin (18) is maintained at a distance from the protective cover (19), and an activation position, in which the protective cover (19) is pierced. These arrangements allow the device to be activated as required, by moving the cap (6) from the standby position to the activation position. According to the illustrated example for mounting the cap (6) on the container (15), they each have interlocking parts (20 and 21), similar to tongues and grooves. Moving the cap (6) from one position to another is performed by pushing, to cause it to move axially and to move at least one tongue from an initial groove to another axially offset groove. Other alternative ways of mounting the cap (6) on the container (15) between its two positions, standby and activation, may be used.

The protective cover (19) may be positioned at the end of an intermediate cartridge (22) housing the substrate (5) and placed inside the housing (4), as in the embodiment shown. According to other embodiments not shown, the protective cover (19) is positioned directly on the container (15), being mounted or formed jointly with the latter, or is positioned at the end of the substrate (5).

It should be noted that according to various embodiments designed to apply the rule consisting of placing on the cap (6) a pin (18) to pierce a protective cover (19), the cap (6) may be mounted directly on the frame (2) of the filter (1) which comprises a housing (4) holding the substrate (5), as in the embodiments illustrated above. According to another embodiment, the container (15) may be formed from a cartridge or similar item permanently attached to the filtering agent (3) of the filter (1).

In the embodiment illustrated, the substrate (5) is housed inside a first axial zone (23) of the container (15). This first zone (23) is extended by a second axial zone (24), which forms an extension from the container (15) along the entire corresponding wall of the frame (2), to prevent the formation of a zone in which the air flow is not filtered. The second axial zone (24) is preferably permeable in order to allow the purification agent to diffuse through it, and to permit uniform diffusion of the purification agent inside the entire container (15). The permeability of the second axial zone (24) specifically permits the spread of the purification agent from the end of the container (15) with the cap (6), to its opposite end.

The invention claimed is:

1. An antimicrobial purification device, which diffuses a volatile purification agent, for ventilation, heating and/or air conditioning systems, the aforementioned system comprising a passenger compartment air filter (1) comprising a frame (2) holding a filtering agent (3), characterized by the fact that the filter (1) comprises at least one means for integrating a substrate (5) holding the purification agent wherein the aforementioned means for integration comprises a housing (4) holding the substrate (5) positioned in the frame (2) of the filter (1).

2. A device according to claim 1, characterized by the fact that the housing (4) is positioned on the frame (2) extending considerably along at least any one of the dimensions of the latter.

3. A device according to any one of claims 1 and 2, characterized by the fact that the frame (2) being formed in the shape of a box, the housing (4) is positioned inside one of the edges of the box.

4. A device according to any one of claims 1 and 2, characterized by the fact that the frame (2) being formed in the shape of a box, the housing (4) is positioned between two opposite edges of the box.

5. A device according to any one of claims 1 and 2, characterized by the fact that the frame (2) being fitted with a hatch (9) sealing a channel for placing the filter (1) inside the system, the housing (4) is positioned in the aforementioned hatch (9).

6. A device according to claim 1, characterized by the fact that the aforementioned means for integration comprises a container (15) which is permanently attached to the frame (2) in such a way as to form a single component with the filter, and which comprises a housing (4) for holding the substrate.

7. A device according to claim 6, characterized by the fact that the frame (2) being formed in the shape of a box, the container (15) is mounted laterally on one edge of the box.

8. A device according to claim 7, characterized by the fact that the edge of the box is equipped with a trough (16) for holding the container (15).

9. A device according to any one of claims 6 to 8, characterized by the fact that the container (15) is jointly positioned with the frame (2) by molding.

10. A device according to any one of claims 6 to 8, characterized by the fact that the container (15) comprises at least two zones that extend axially, one (23) in which the housing (4) is positioned and the other (24) forming an extension of the container (15) along the entire corresponding wall of the frame (2) in order to prevent the formation of a zone in which the air flow is not filtered.

11. A device according to any one of claims 1 and 6, characterized by the fact that the aforementioned housing (4) is sealed with a cap (6) equipped with a means to connect to the filter (1).

12. A device according to claim 11, characterized by the fact that the means for connecting the cap (6) to the filter (1) are reversible.

13. A device according to claim 11, characterized by the fact that the means for connecting the cap (6) to the filter (1) are irreversible.

14. A device according to claim 11, characterized by the fact that the cap (6) is permanently attached to an intermediate cartridge (7) housing the substrate (5).

15. A device according to claim 11, characterized by the fact that the cap (6) is fitted with a pin (18) for piercing a protective cover (19) sealing the housing (4).

16. A device according to claim 15, characterized by the fact that the substrate (5) being housed inside a container (15), the aforementioned container is fitted with the aforementioned protective cover (19).

17. A device according to claim 15, characterized by the fact that the aforementioned protective cover (19) is positioned at the end of the substrate (5).

18. A device according to claim 15, characterized by the fact that the aforementioned protective cover (19) is positioned inside the housing (4) comprised of the filter (1) that holds the substrate (5).

19. A device according to claim 11, characterized by the fact that the means for connecting the cap (6) to the frame (2) is a means with two positions between which the cap (6) is freely mounted on the frame (2), one position is the standby position in which the pin (18) is maintained at a distance from the protective cover (19), and the other is the activation position in which the pin (18) pierces the protective cover (19) in order to release the volatile purification agent.

20. A ventilation, heating and/or air conditioning system comprising an antimicrobial purification device including a filter having a frame (2) holding a filtering agent (3), characterized by the fact that the filter (1) comprises at least one means for integrating a substrate (5) holding a purification agent wherein the aforementioned means for integration comprises a housing (4) holding the substrate (5) positioned in the frame (2) of the filter (1).

21. A system according to claim 20, characterized by the fact that the filter (1) may be placed upstream and/or downstream from an evaporator contained within the system.

22. A system according to any one of claims 20 and 21, characterized by the fact that the filter is housed inside a unit also containing functional components of the system.

23. A system according to any one of claims 20 and 21, characterized by the fact that the filter is housed inside a dedicated unit, and is placed under the vehicle's cowl in order to be accessible from the engine compartment.

24. An antimicrobial purification device, which diffuses a volatile purification agent, for ventilation, heating and/or air conditioning systems, the aforementioned system comprising a passenger compartment air filter (1) comprising a frame (2) holding a filtering agent (3), characterized by the fact that the filter (1) comprises at least one means for integrating a substrate (5) holding the purification agent wherein the aforementioned means for integration comprises a container (15) which is permanently attached to the frame (2) in such a way as to form a single component with the filter, and which comprises a housing (4) for holding the substrate.

* * * * *